(12) United States Patent
Yaniv

(10) Patent No.: US 6,883,918 B2
(45) Date of Patent: Apr. 26, 2005

(54) PORTABLE, DIGITAL PROJECTOR DEVICE AND A SYSTEM USING THE SAME

(76) Inventor: Zvi Yaniv, 3006 Longhorn Blvd., Austin, TX (US) 78758

( * ) Notice: Subject to any disclaimer, the term of this patent is extended or adjusted under 35 U.S.C. 154(b) by 191 days.

(21) Appl. No.: 10/246,000

(22) Filed: Sep. 18, 2002

(65) Prior Publication Data

US 2003/0053034 A1 Mar. 20, 2003

Related U.S. Application Data

(60) Provisional application No. 60/323,435, filed on Sep. 20, 2001.

(51) Int. Cl.[7] ............................................... G03B 21/14
(52) U.S. Cl. ......................................... 353/79; 353/122
(58) Field of Search .............................. 353/28, 39, 42, 353/79, 119, 122

(56) References Cited

U.S. PATENT DOCUMENTS 5,517,264 A * 5/1996 Sutton ......................... 353/119
6,283,600 B1 * 9/2001 Levasseur ..................... 353/119
6,371,616 B1 * 4/2002 Doany et al. ................... 353/39
6,695,452 B2 * 2/2004 Panasewicz et al. .......... 353/119
2002/0089650 A1 * 7/2002 Stewart ......................... 353/43
2002/0118344 A1 * 8/2002 Fischer et al. ................. 353/97

* cited by examiner

*Primary Examiner*—William C. Dowling

(57) ABSTRACT

A portable, personal, wearable image projection system is described in which light is provided by a low power, light weight source so as to minimize overheating and overburdening the user. Source images are initially displayed on an image projection screen, and then displayed on an associated image reception screen, via light transmitted through said image projection screen by the light source. A user interface may be provided to allow for manipulation of information, either via a wired or wireless interface. Source images may be provided from a host of different devices such as a computer, a television, an internet device or some type of personal communications device.

19 Claims, 2 Drawing Sheets

PORTABLE, DIGITAL PROJECTOR DEVICE AND A SYSTEM USING THE SAME

CROSS REFERENCE TO RELATED APPLICATION

This patent application claims the benefit of priority to U.S. provisional patent application Ser. No. 60/323,435 filed Sep. 20, 2001, which is entirely incorporated herein by reference.

FIELD OF THE INVENTION

The invention relates in general to digital projection systems, and more particularly to lightweight, portable digital projection devices and systems in which the backlight, projector and associated screen are discrete devices that are responsive to each other.

BACKGROUND OF THE INVENTION

Since the mid-1980's many companies have tried to develop and produce digital projectors based on liquid crystal display technology. InFocus®, Inc. is the acknowledged leader in digital projection and was a pioneer in mobile projection technology. As a result of their efforts, table-top portable projectors have become commonplace in the arsenal of tools available to professionals needing to present information to groups of people. Indeed, According to International Data Corporation, the microportable projector category is expected to more than double in 2001, with approximately 335,000 units expected to sell worldwide this year. A number of innovations and technology advancements have come together to reduce the size and weight of projectors while simultaneously increasing the brightness and resolution of these portable devices. Those factors, combined with a growing number of mobile professionals, have rapidly shifted projectors from specialty items to essential business tools.

Early efforts in this area resulted in projectors that were very large, boxy, and quite heavy, often on the order of 15–20 pounds. In addition, resolution was suspect, and the devices were incapable of displaying video speed information. Over the intervening years, these devices have become much smaller, with the current state of the art, as of June 2001, being a three-pound digital projector representing a new benchmark in projector portability. To illustrate the rapid miniaturization of this product, it is 40 percent smaller than the most popular product it replaces.

In addition to portability, there are other features of such systems that make them desirable. For example, the brightness of the display, often expressed in lumens per pound, is a critical feature that is sought after by consumers. State of the art products offer 1100 lumens of brightness, which converts into over 365 lumens per pound. This, coupled with multimedia functionality and XGA resolution make such devices ideal for the education, government and other markets. With growing commercial acceptance, it stands to reason that such devices will soon enter new markets such as home entertainment The growing acceptance of such devices also makes it likely that at some point they will become part of networking projection systems that connect multiple conference rooms in a single facility, thus enabling group collaboration. Such networked devices could also provide Internet and network access as well as network management capabilities. Likewise, such devices are currently hardwired to the video source, thus providing greater connectivity options and developing wireless projection systems that seamlessly transmit data and video will improve the value and usability of such devices.

Notwithstanding the success of the current products, they have largely reached the logical end of the drive to miniaturization so long as the current table-top box paradigm is followed. This is due to the inescapable conclusion that there are limits to how small a package can be while still housing the LCD projection screen, lighting assembly, cooling mechanics, and associated electronics and connections. Accordingly, there exists a need for a new approach to portable digital display systems which does not rely upon the need to put the lighting system into the same structure as the LCD projection screen. These and other advantages of the instant invention will be set forth herein.

DESCRIPTION OF THE INVENTION

Figure 1:
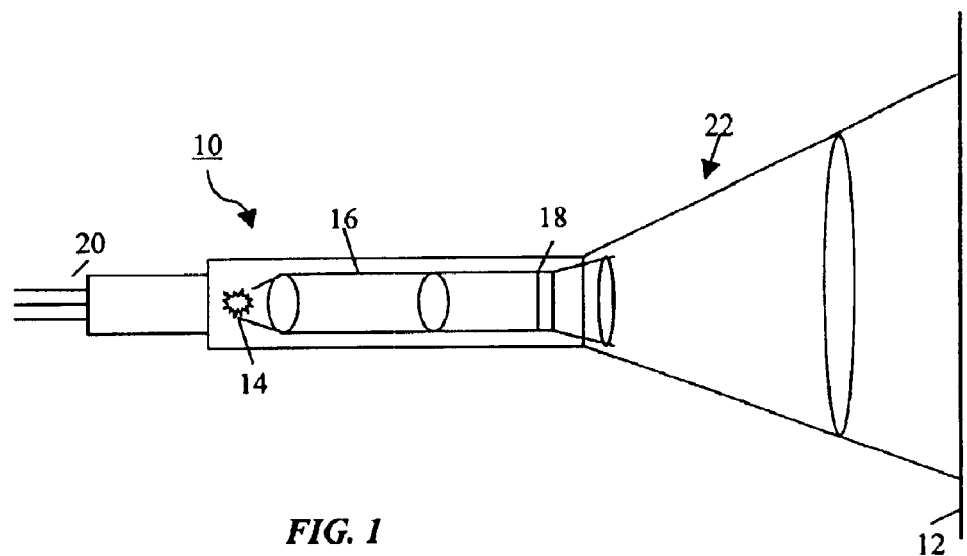
FIG. 1 is a simplified diagram of a first embodiment of a portable digital projector in accordance with the instant invention.

Referring now to FIG. 1, there is illustrated therein a simplified diagram of a first embodiment of a portable digital projector in accordance with the instant invention. In this embodiment, the portable digital projector 10 is contemplated to be used in close proximity to a screen 12. Accordingly, the intensity of the light source used in connection with the projector may be much lower than in conventional LCD projectors of the prior art. Thus, the light source 14 need only have a light intensity on the order of 1,000 NITS. It may therefore be appreciated that the requirements of the light source 14 can be met by many means including a standard incandescent bulb placed either in the projector itself or disposed in proximity thereto. The essential requirement for the light source is simply that it be capable of producing a sufficient amount of light to project information onto a stage. By using such a low power source, heat emission is substantially reduced, thereby eliminating the need for mechanical cooling systems. This in turn reduced substantially the power consumption of the device, with the result being that portability is enhanced dramatically. In other forms, the ultimate light source may be somewhat remote from the projector 10, but with the light being piped to the projector by means of, for example, an optical fiber or light piping interface. This provides the advantage of disposing the light source in e.g., a wearable module thus reducing the weight of the portable digital projector.

Light emanating from the light source 14 (either internal or external) is directed through a lens system 16 for properly orienting the light prior to it striking the projector screen 18. The projector screen 18 may comprise any of a number of different devices, examples of which include liquid crystal displays of any of a number of known varieties, micromirror projectors, micro-displays, and liquid crystal-on-silicon devices to name but a few.

As with all conventional LCD devices, the images presented thereon are provided by an external device, such as a lap-top computer (not shown). While there is not a computer or other external device for providing the images shown in FIG. 1, it is to be appreciated that the projector 10 provides external connectors 20 for coupling the projector to the external device, be it a computer, a television or some other device.

After passing through the LCD projector screen 18, the light having been influenced by the information presented on screen 18, passes through a second lens system 22 for appropriately sizing the image to be displayed to a particular screen 12. In an embodiment where the projector is used in close proximity to the screen, this lens system need only expand the projected image by a small amount, thus keeping the system 22 relatively small.

Figure 2:
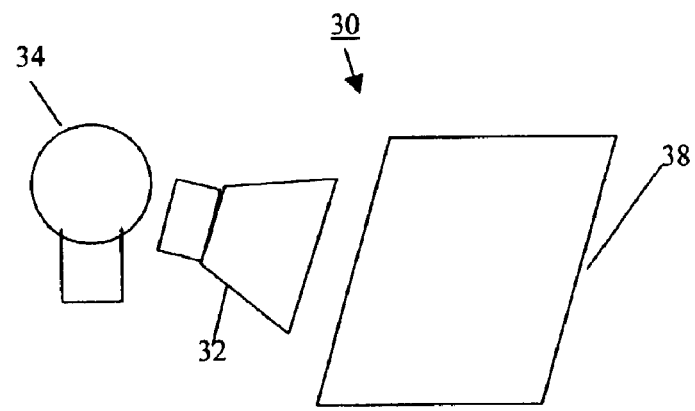
FIG. 2 is a simplified diagram of an embodiment of a portable digital projector system in accordance with the instant invention.

Referring now to FIG. 2, there is illustrated therein a simplified diagram of an embodiment of a portable digital projector system 30 in accordance with the instant invention. The system 30 includes a projector 32 such as that described hereinabove in FIG. 1, and wherein the projector 32 relies on an external light source 34. In the embodiment of FIG. 2 the projector is part of a portable or wearable information delivery device 36, such as an internet appliance, a television receiver, an electronic book, an electronic newspaper, or a computer. Also part of the device 36 is a small screen 38 that may be formed integrally with the device such that the screen may be deployed from the device when activated, for the display of information.

To enhance the functionality of the device, regardless of the particular use to which it is put, the screen 38 may be an amplifying screen which enlarges the images cast thereon. Likewise, the screen 39 may comprise a holographic display or a multiplayer screen so as to enhance the image quality. A further refinement to the screen is the provision of touch input means allowing the user to interact directly with the device via user interfaces displayed on the screen. In this embodiment, the screen 38 is linked to the device, e.g., a computer, via a wireless or wired interconnection so that the computer is properly synchronized with the information being displayed and selected on the screen. Interaction with the touch screen may be accomplished via any of a number of known interface devices including the user's finger, a pen or a stylus. The screen may also be made of a foldable material so as to enhance the portability of the device.

Figure 3:
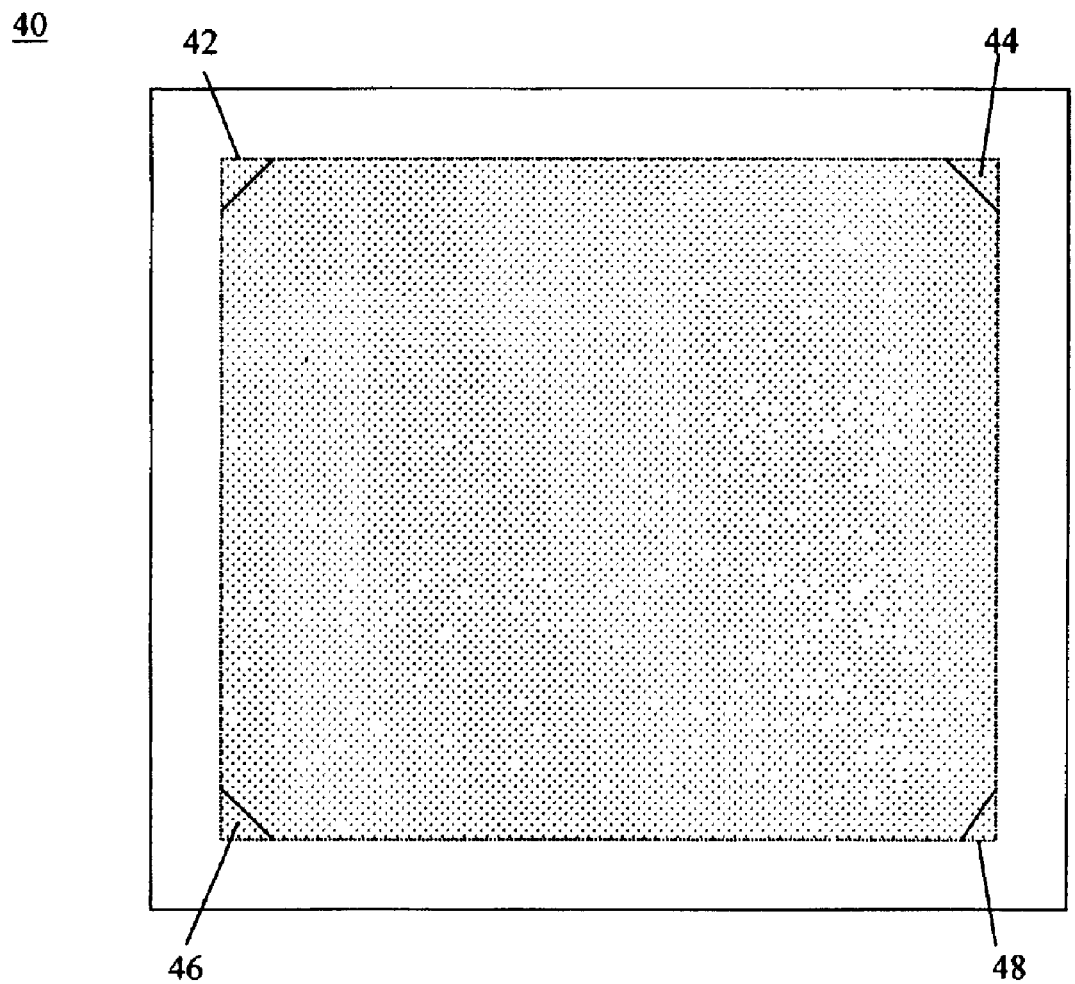
FIG. 3 is a simplified diagram of a screen to be used in connection with a projector system as in FIG. 2.

Referring now to FIG. 3, there is illustrated therein a simplified diagram of a screen to be used in connection with a projector system. To enhance the quality of the image displayed on the screen, the screen may be fully synchronized with the projector so that the image size and quality is matched perfectly to the distance the screen is disposed from the projector. This is accomplished by equipping the screen 40 with sensors 42, 44, 46 and 48 for providing instantaneous feedback to the second lens system 22 of FIG. 1 so as to optimize the quality of the displayed image. Such lens optimization may be controlled by a microprocessor as is commonly known in the art. Likewise, the projector may be used to alternative project information onto a hard "screen" such as a wall. In this instance, the user would in effect transform the device from a personal device to a presentation device by simply aiming the projector at a larger stage. The projector may thus be equipped with microprocessor controlled lens optimization devices to control the quality of the projected image.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

I claim:

1. A portable wearable image projection system comprising:

an image reception screen for receiving an image generated by said projection system;

a low temperature, low intensity light source for illuminating said image projection screen, said light source being operatively coupled to said screen so as to provide varying amounts of light depending upon the distance said screen is disposed from said light source;

an image projection screen disposed between said light source and said image reception screen for generating a source image to be displayed on said image reception screen; and a light influencing means for orienting light generated by said light source and focusing light projected through said image projection screen and onto said image reception screen, said light influencing means being adapted to size the source image to the image reception screen regardless of the distance the image reception screen is disposed from said image projection screen.

2. A portable, wearable image projection system as in claim 1, wherein said image reception screen is made of a flexible material to accommodate ease of transport.

3. A portable, wearable image projection system as in claim 1, wherein said light influencing means automatically focuses said source image onto said image reception screen, regardless of the distance said screen is disposed from said image projection screen.

4. A portable, wearable image projection system as in claim 1, further including a user interface for allowing manipulation of information presented on the system.

5. A portable, wearable image projection system as in claim 4, wherein said system communicates with an information source via said user interface.

6. A portable, wearable image projection system as in claim 5, wherein said information source is coupled to said system via a wireless connection.

7. A portable, wearable image projection system as in claim 5, wherein said information source is a computer.

8. A portable, wearable image projection system as in claim 5, wherein said information source is an internet device.

9. A portable, wearable image projection system as in claim 4, wherein said user interface is voice actuated.

10. A portable, wearable image projection system as in claim 4, wherein said user interface is actuated by touch.

11. A portable, wearable image projection system as in claim 4, wherein said user interface is actuated by a stylus.

12. A portable, wearable image projection system as in claim 1, wherein said light source has an intensity of less than 500 lumens.

13. A portable, wearable image projection system as in claim 1, wherein said light source has an intensity of less than 100 lumens.

14. A portable, wearable image projection system as in claim 1, wherein said light source is disposed remotely from said image projection screen.

15. A portable, wearable image projection system as in claim 14, further including a light pipe disposed between said light source and said image projection screen.

16. A portable, wearable image projection system as in claim 1, wherein said image projection screen is a liquid crystal display.

17. A portable, wearable image projection system as in claim 1, wherein said system is adapted for use as an electronic newspaper.

18. A portable, wearable image projection system as in claim 1, wherein said system is adapted for use as a computer display.

19. A portable, wearable image projection system as in claim 1, wherein said system is adapted for use as a television screen.

* * * * *